Dec. 22, 1959     E. T. J. TAPP ET AL     2,918,131
IMPLEMENT SUPPORTING MECHANISM FOR TRACTORS
Filed April 13, 1956     3 Sheets-Sheet 1
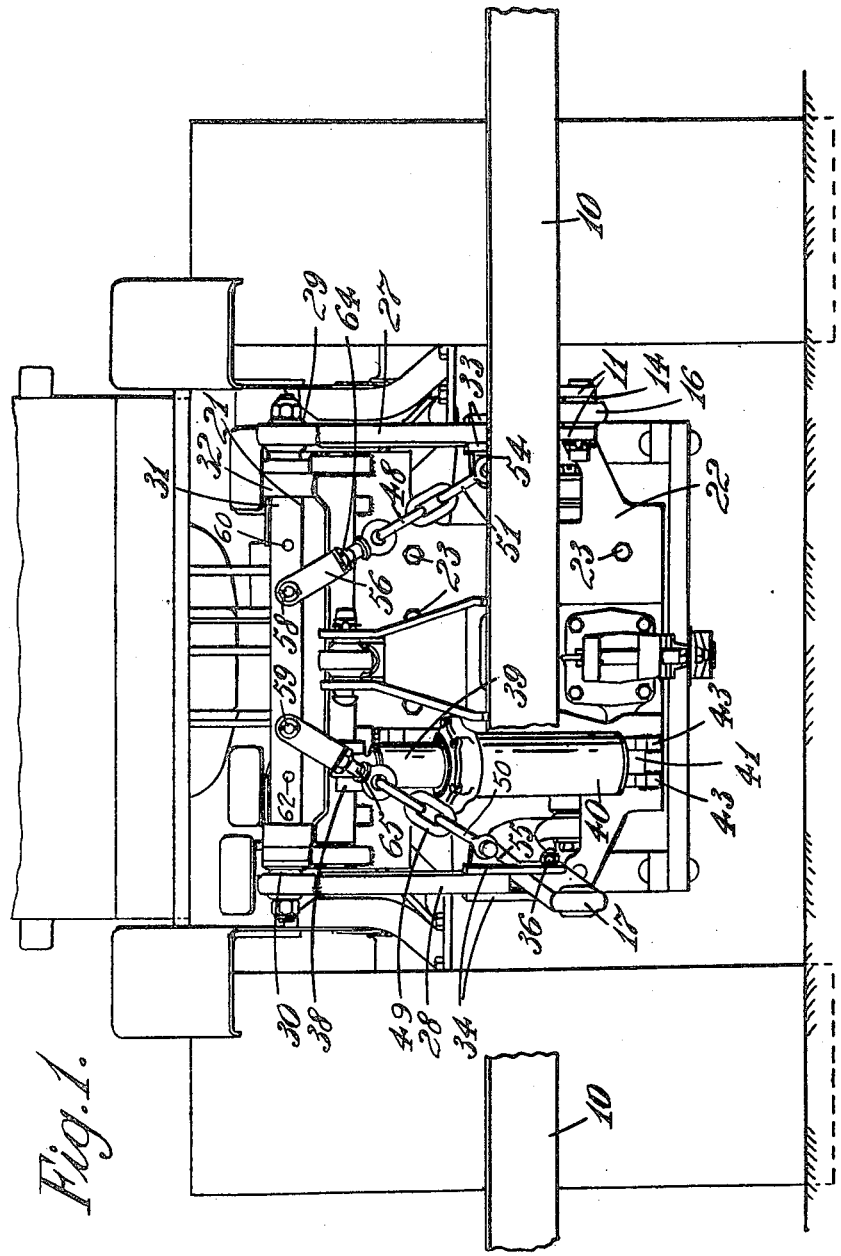
INVENTORS
ERNEST T. J. TAPP &
JOSEPH DAVEY
BY Young, Emery & Thompson
ATTYS.

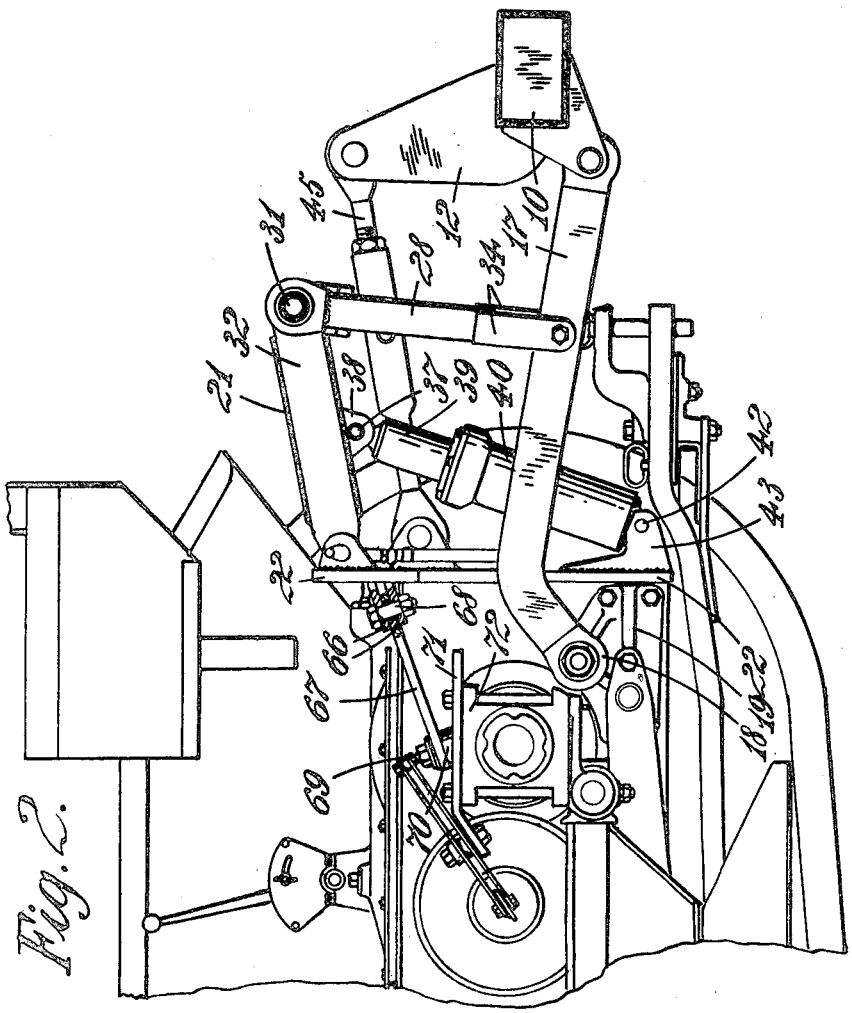

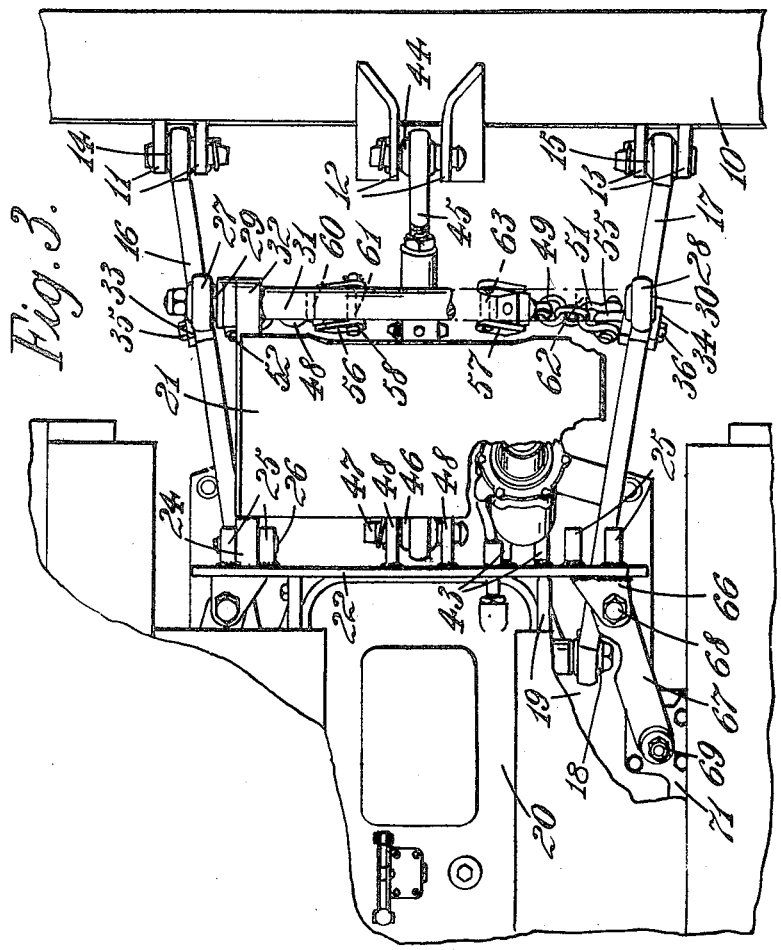

United States Patent Office 2,918,131
Patented Dec. 22, 1959

2,918,131

IMPLEMENT SUPPORTING MECHANISM FOR TRACTORS

Ernest Thomas James Tapp and Joseph Davey, Fleet, Aldershot, England, assignors to County Commercial Cars Limited, Fleet, Aldershot, England, a British company Application April 13, 1956, Serial No. 578,102

Claims priority, application Great Britain April 14, 1955

3 Claims. (Cl. 172—445)

This invention relates to implement supporting mechanism for tractors of the kind in which an implement support is carried at the extremities of two spaced arms which extend in a fore and aft direction and are pivoted to a part of the tractor so that they may swing both in an up and down direction, and laterally, which up and down movement is imparted to them by a hydraulic ram through a suitable transmission. Such an arrangement is particularly advantageous when the implement support carries implements for cultivation.

According to this invention an implement supporting mechanism of the kind referred to above is characterised in that adjusting means are provided whereby said arms may either be restrained against lateral movement or be permitted to move laterally to at least a limited extent.

In one construction according to the invention, the aforesaid arms are respectively slung by two links from a structure pivotally mounted on a part of the tractor to swing only in an up and down direction, and which structure is acted upon by the aforesaid ram, and which links are so connected between said structure and the lever arms as to permit lateral movement of the lever arms and adjustable bracing means is provided between said links and said pivoted structure so that according to the adjustment of the bracing means said lateral movement may or may not take place.

The adjustable bracing means may comprise a chain or cable or telescopic link extending in an inclined manner from a part of each link to one of two anchorages on said structure, the length of each of which chains or cables or telescopic links is such that when each of them is attached to one anchorage, lateral movement of the links is prevented, while when attached at the other anchorage lateral movement is permitted.

Preferably means are provided for adjusting the effective length of each chain, cable or telescopic link, for example a turnbuckle may be associated with each chain or cable or telescopic link.

The aforesaid implement support may be mounted on said arms, so as to be oscillatable about a transverse axis and may have pivotally connected thereto at a point disposed away from said axis, a control link which is also pivotally connected to a part of the tractor, so that as said arms swing in an up and down direction, the angular position of the implement support about said axis is controlled.

The pivotal connections between the control link and the part of the tractor and the implement support are such as to permit the aforesaid lateral movement of the support.

The following is a more detailed description of one embodiment of the invention, reference being made to the accompanying drawing in which:

Figure 1 is a rear elevation of the apparatus;
Figure 2 is a side elevation; and
Figure 3 is a plan.

The implement support comprises a rigid beam 10 having a box like section and from the forward side of which project three pairs of lugs 11, 12, 13 spaced apart. To the two outer pairs of lugs are pivotally connected at 14 and 15 two forwardly extending arms, 16, 17 which pivotal connections are arranged to permit universal movement between the arms and the lugs; for example said pivotal connections 14, 15 may comprise ball joints. The forward extremities of the two arms are each universally and pivotally connected by a ball joint 18 (see Figure 3) on a bracket 19 bolted to the rear transmission case 20 of the tractor. A rigid box like structure 21 is pivoted to a base plate 22 secured by bolts 23 to the rear transmission case 20. For this purpose the box like structure is provided with forwardly projecting drilled lugs 24 at the sides thereof which are received between drilled arms 25 welded to the plate 22. Pivot pins 26 extend through the registering holes in the lugs and arms. The arrangement is such that the rigid structure 21 can only swing about a transverse axis as compared with the universal movement of said arms 16, 17. Two links 27, 28 are connected at one end by ball joints 29, 30 to the ends of a rod 31 which is rotatable in holes in rearwardly projecting portions of the side members 32 of said rigid box like structure and the other ends of the links 27 and 28 are provided respectively with forks 33, 34 which are connected to said two arms 16 and 17 by plain pivot pins 35, 36. Pivotally connected at 37 to two lugs 38 attached to a part of said rigid box like structure 21 is the plunger 39 of a ram, the cylinder 40 of which is provided with a lug 41 pivotally connected at 42 between two bracket members 43 welded to the bottom of the aforesaid base plate 22. By energising the ram the said arms 16, 17 and beam 10 may be raised and when the ram is de-energised the beam falls by gravity. Also, by reason of the ball joints 14, 15, 18, 29, 30, lateral movement may be imparted to the implement support 10.

The plate 22 extends laterally beyond the sides of the transmission case and each projecting portion has secured to the front face thereof two superimposed lugs 66 which are inclined downwardly and between which is secured one end of a strap 67 by a bolt 68; the other end of each strap is secured by a bolt 69 to a boss 70 on a plate 71 fixed to a part of the axle casing 72 which extends laterally from the transmission case.

The two central lugs 12 on said beam 10 project upwardly in relation to the other lugs and are connected by a ball joint 44 to one end of an adjustable control link 45, the other end of which link is connected by a ball joint 46 to a pin 47 carried by two lugs 48 on the aforesaid base plate 22. Thus, as the lever arms move in an up and down direction, the control link controls the angular position of the implement support in relation to the arms 16 and 17.

Under certain conditions, the lateral movement of the implement bar may not be required, and in order to fix it against this movement, there are provided two chains, 48, 49 the lower ends of which are provided with shackles 50, 51 secured by pins 52, 53 to lugs 54, 55 fixed to the forks 33 and 34 respectively. The upper ends of the chains have secured thereto forks 56, 57 which straddle the rod 31 and are secured thereto by pins 58, 59. The former may extend through either of two holes 60 and 61 and the latter through either of two holes 62, 63. The forks 56 and 57 incorporate turnbuckles 64, 65. If the pins 58, 59 engage the holes 61, 63 nearer the centre of the rod 31 (as shown), the turn buckles may be adjusted so as to cross brace the links 27, 28 and arms 16 and 17 against lateral movement. If, however, the pins are removed and introduced into the outer holes 60, 62, the chains become slack and thus permits a limited lateral movement of the links, arms and beam.

We claim:

1. An implement-supporting mechanism for use with a tractor comprising two arms each having an articular connection for attachment to said tractor, said connection permitting both vertical and lateral movement of the arms, an implement carrier attached to the free extremities of said arms, a rigid structure pivotally attached to said tractor above said arms so as to swing in a vertical direction without lateral movement, a link pivotally connected at one end to each arm at a distance away from the implement carrier and connected at the other end to said rigid structure so as to permit lateral movement of the arms and carrier, power means for imparting vertical movement directly to said rigid structure, and adjustable flexible tethers connected between said arms and rigid structure so that according to the adjustment of the tethers lateral movement of the arms relative to the rigid structure may take place either to a limited extent or not at all.

2. An implement-supporting mechanism according to claim 1 wherein each of said flexible tethers extends in an inclined manner upwardly and inwardly from the arm to which it is attached to one of a number of alternative anchorage points on the rigid structure so that the flexible tethers converge as they extend upwardly.

3. An implement-supporting mechanism according to claim 1 and comprising pivotal connections between the implement carrier and said arms which permit the carrier to oscillate about a transverse axis and a control link having pivotal connections at its ends for attachment respectively to a part of the tractor and to an anchorage on the implement carrier disposed away from the axis of oscillation so that as said arms swing in a vertical direction the angular position of the implement carrier about the transverse axis is controlled, said pivotal connection between the control link and tractor being adapted to permit lateral swinging of said control link.

References Cited in the file of this patent

UNITED STATES PATENTS

| | | |
|---|---|---|
| 2,430,732 | Orelind et al. | Nov. 11, 1947 |
| 2,513,783 | Blessinger | July 4, 1950 |
| 2,547,438 | Burkholder | Apr. 3, 1951 |
| 2,609,215 | Hancock | Sept. 2, 1952 |
| 2,620,716 | Ciancio | Dec. 9 1952 |
| 2,692,148 | Bywater | Oct. 19, 1954 |
| 2,704,497 | Phelps | Mar. 22 1955 |
| 2,765,723 | Clarke et al. | Oct. 9, 1956 |